United States Patent [19]
Williams

[11] 3,826,322
[45] July 30, 1974

[54] ACCESSORY WHEEL AND DRIVE DEVICE FOR A MOTOR VEHICLE

[76] Inventor: Samuel D. Williams, 1923 Hennessy Pl., Bronx, N.Y.

[22] Filed: Sept. 28, 1972

[21] Appl. No.: 292,937

[52] U.S. Cl. ............... 180/1 AW, 180/52, 180/79.1
[51] Int. Cl. .......................... B60s 9/14, B62d 5/04
[58] Field of Search.......... 180/1 AW, 1 A, 79.1, 52

[56] References Cited
UNITED STATES PATENTS

| | | | |
|---|---|---|---|
| 2,872,991 | 2/1959 | Collins | 180/1 A |
| 3,003,571 | 10/1961 | Ash et al. | 180/1 A |
| 3,120,398 | 2/1964 | Butterworth | 180/1 A |
| 3,186,686 | 6/1965 | Mayer | 180/1 A |
| 3,240,287 | 3/1966 | Lepore et al. | 180/1 A |

FOREIGN PATENTS OR APPLICATIONS

| | | | |
|---|---|---|---|
| 1,267,145 | 6/1961 | France | 180/1 A |

Primary Examiner—Richard A. Schacher
Assistant Examiner—James W. Miller

[57] ABSTRACT

In a preferred embodiment an automobile having four extra accessory utility wheels mounted on hydraulic jacks, with the back two accessory wheels being connected for synchronized steering thereof in both lateral and forward directions of movement of the car as well as the forward two wheels being synchronized with one another for synchronized steering in both lateral and forward directions and there being switch means whereby the front wheels and the rear wheels may be synchronized to one another for the forward and/or lateral steering, and at least one of the sets of front and back accessory wheels being connected for and including propulsion means alternately drivable by the regular automobile motor or by an electrical motor, the electrical motor-including embodiment also including accessory batteries connected to provide electricity to any accessory electrical motor and also connected to continually charged if necessary by the generator of the automobile, this above described combination of this invention providing both parking advantages and emergency power and wheels in the event of flat tires or other mechanical difficulty requiring supplemental driving power for propulsion of the automobile for reasonably short periods of time to remove the automobile from hazardous traffic locations or to propel the automobile to an appropriate next-occurring filling station or repair facility.

6 Claims, 3 Drawing Figures

PATENTED JUL 30 1974　　　　　　　　　　　3,826,322

ACCESSORY WHEEL AND DRIVE DEVICE FOR A MOTOR VEHICLE

This invention is directed to accessory wheels for motor vehicles such as automobiles and trucks.

BACKGROUND TO THE INVENTION

Prior to the present invention typically there have existed for example patents such as U.S. Pat. No. 3,120,398 directed to wheels located adjacent each wheel as associated with the back axle of either an automobile or of a truck trailer of the type having a cab and attached trailer therebehind, with the wheels being extendable to a position which lifts the normal rear automobile or trailer wheels off of the ground and there being within the automobile or the cab a steering mechanism for steering the laterally directed wheels to a minor extent, this patent however not dealing with the problem of how to provide propulsion to drive the laterally directed wheels for an automobile, the patent merely disclosing the effect of moving the trailer by action of the truck cab, as well as the fact that this patent is limited solely to wheels directed laterally for lateral movement of the back end sidewardly and has no utility and fails to contemplate the utilization of such wheel for movement in other directions or as to how propulsion would be added with the automobile rear wheels lifted off the ground. The patent by virtue of being limited solely to the back axle is clearly directed solely to the swinging of the rear end of a trailer or of an automobile to and fro from a curb during parking operations. The U.S. Pat. No. 2,708,002 similarly provides a rear axle single wheel providing solely lateral movement to and from parking positions but additionally including a drive mechanism as associated with the normal back axle drive of an automobile as driven by the drive shaft power transmitted to the differential of the automobile. Similarly this patent is limited to solely the lateral movement and additionally includes no steering except such as might be provided by the front wheels of the automobile. The jack means of the two above patents both are of a hydraulic nature, for extending and retracting the accessory one or more rear axle wheels. U.S. Pat. No. 3,196,969 discloses a reversible electric motor connected to extend or retract an accessory wheel designed and mounted for movement of the car laterally to and fro in parking positions, there being a single accessory wheel for raising the wheels at the end of the car at which the single wheel is mounted, it not being possible in this invention to employ such a wheel at each of opposite ends for simultaneous operation since there is provided solely the single wheel which in the absence of two wheels at the other end on the ground or pavement would cause the automobile to tip over sidewardly to rest on forward and back wheels on one side or the other. This patent also discloses hydraulic means for the providing of driving power to the accessory wheel. The U.S. Pat. No. 2,808,271 similarly discloses an accessory single rear wheel mounted transversely in the rear of the vehicle to pivot the vehicle about its front wheels while parking, utilizing as its inventive novelty the weight of the automobile in descending from the jacked up extended position to the down position for a source of power for propulsion of the accessory wheel rotatably to move the automobile to and from parking positions sidewardly. The U.S. Pat. No. 3,084,756 similarly discloses accessory tires that raise the car or retract the folds rearwardly in the back of the rear axle typically mounted on a single toggle to move the rear of the car to and from the curb in parking positions or other such laterally located positions, this accessory wheel being connected to be drivable by the regular power motor of the vehicle.

In contrast to these prior patents which all have been directed solely to the problem of parking an automobile by lateral movement of principally the rear of the automobile, since the front of the automobile normally has wheels which are steerable sufficiently satisfactorily for lateral movement of the front of the car, and these patents not being directed to any other problems to which the present invention is principally directed.

In particular, the present invention is directed to a combination providing emergency wheels for use in the eventuality of flat tires, axle problems, drive shaft problems, motor failures, giving out of gasoline, and the like, it including the failure of front wheels and/or steering gear as a problem.

SUMMARY OF THE INVENTION

Accordingly, the overcoming of one or more of the above type problems and difficulties not solved nor contemplated to be solved by prior existing accessory wheels and accessory drive mechanisms is an object of the present invention.

Another object is to obtain a motor vehicle having structure which obtains the benefits stated above.

Another object is a motor vehicle structured to additionally have a lateral parking advantage asscoiated with prior accessory-wheeled vehicles.

Other objects become apparent from the preceding and following disclosure.

One or more objects of the present invention are obtained by the invention as defined herein.

Broadly the invention includes a motor vehicle such as an automobile or a truck of the type having forward and rearward separate axles with at least three wheels, there being at least two wheels on either the forward and rearward axle and at least one on the remaining axle, but typically a motor vehicle having two wheels in the front and two wheels in the back. Each of the front and back axle locations are provided with at least one accessory wheel per front and back axle but preferably has a separate accessory wheel per front wheel and per back wheel — which for a four wheeled vehicle having two front wheels and two back wheels would result in four accessory wheels. In an embodiment having a single wheel for the front axle and a single wheel for the back axle, for purposes of this invention the wheel would have to be sufficiently wide or broad that when in the extended position for lifting the front wheel off of the supporting surface, or alternately for the back axle for lifting the back wheels off of the supporting ground surface, that the accessory wheel would be able to support the automobile in a stable position not subject to tipping-over the automobile sidewardly in one direction or the other. Thereby the invention includes the utilization of such accessory wheels in both the front and rearward locations so that if both the front and rear wheels are incapacitated, the automobile may proceed supported solely on the combined rear and forward accessory wheels. In the case of there being a single wheel for each axle, there would be merely two wheels centrally located, one in the front and one in the back. If the wheel were not sufficiently broad the automobile obviously could not be supported off the ground with all wheels free from contact with the ground without the possibility of the automobile tipping over.

Accordingly, for purposes of the present invention in a preferred embodiment as stated above there is a separate accessory wheel for each of the four conventional wheel locations such that there are two rearward accessory wheels, one on the right and one on the left, and two forward accessory wheels, one on the right and one on the left.

As an integral part of the present invention, each and every one of the wheels of the invention are steerable in at least forward directions and at least one of the rearward set or the forward set of accessory wheels are steerable for both forward and lateral movement so that the automobile may be steered when all four conventional wheels are lifted off of the ground. More preferably however, all wheels are capable of being steered both forwardly and laterally such that not only is it possible to move the car when incapacitated out of hazardous or blocked-in positions by virtue of steering both rearward and forward accessory wheels, but also such that as is necessary, the wheels may be utilized in the event that the forward wheels or steering gear are incapacitated for steering purposes.

An additional benefit of the present invention whether there be a single accessory wheel for each of respective front and rearward locations or whether there be alternatively a single accessory wheel for each respective two rear wheels and for each respective two forward wheels, is that in the event of a flat which the car owner wishes to repair, the particular location may be merely raised off the ground while the flat tire is removed and replaced with a wheel containing a good tire.

Additionally an advantage of the invention as described above is that, in preferred embodiments in which either a single accessory rearward wheel or alternatively a plurality of rearward accessory wheels, as well as the same being true for one or more forward accessory wheels, in the event that the automobile has become bogged-down in sand or snow or mud at either the forward or rearward location or where a wheel or a plurality of wheels is in a ditch or the like, the accessory one or more wheels may be utilized for raising the automobile from such position in the absence of other facilities to get the automobile driver out of such an emergency problem. For such a type emergency situation, it is desired that the accessory wheel, and it is a preferred embodiment of this invention, that the accessory wheel for each location be much more broad or wider than the conventional wheels normally used on the automobile such that the wideness or breadth of the wheel provides additional surface area which is not subject to being stuck in sand, snow, small crevices, or the like.

In a preferred embodiment of the present invention, the power for driving at least the rearward but preferably either or both the rearward and forward wheels, is a battery power providable by the inclusion of separate accessory batteries preferably connected for conventional generator charging at any time charging is needed during regular conventional use of the automobile. This accessory power preferably is provided by either conventional or special batteries, preferably conventional batteries such as cobalt batteries which are long lived and dependable whenever an emergency situation arises, irrespective of non-use of the battery for long periods of time. The battery power preferably includes connections for substitution of its power for the conventional battery whenever the problem is merely the failure of the normally utilized battery for the automobile, but the accessory battery being primarily utilizable used in preferred embodiments in conjunction with an electric motor, with either a single electric motor providing power for all accessory wheels or for a plurality of accessory wheels or otherwise in an alternate embodiment with a separate electric motor for each of one or more of the accessory wheels. The power provided through the electric motors may be utilized solely for the extension of the one or more accessory wheels to the extended position and/or may be utilized for the driving of the one or more accessory wheels in rotary directions for the supplemental propulsion of the automobile whenever for some other reason conventional power of the automobile is not utilizable, such as for example would be the case if the rear axle or differential were out of order or if both rear wheels were incapacitated or stuck or the like. In a preferred embodiment, the electric motors are for providing propulsion along a surface such as a highway.

The power for raising the automobile by extension of the accessory wheels and/or the power for driving the automobile along the highway by virtue of rotation of one or more of the accessory wheels may alternatively be provided by hydraulic means drivable either by an electric motor or by the conventional motor found in the automobile or the truck.

In a preferred embodiment of the present invention each wheel has its own separate drive means for propelling the accessory wheel rotatably along a highway in view of the fact that it is not desired to utilize both accessory wheels when merely one conventional wheel is incapacitated and/or when another accessory wheel for some reason or another is out of order insofar as providing its propulsion drive. Accordingly, by such an arrangement one accessory wheel drive mechanism backs up the other one or more drive mechanisms for the accessory wheels.

It should be noted that there is no requirement for any technology in the present invention, the present invention being able to utilize conventional means of propulsion and of steering and of extending the wheels to the jacked up position and of retracting the wheels, and the like. Accordingly any conventional mechanisms may be utilized for this, including for example any one or more of the disclosures of the type patents discussed above, to the extent that such mechanisms are compatible with the other requirements of the present invention, namely that the accessory wheels of the present invention both forward and rearward be steerable at least, and that at least one of the accessory rearward wheels and preferably also at least one of the forward accessory wheels be rotatably drivable for propelling the vehicle along a highway or other surface. Accordingly, the disclosure of the above discussed patents is incorporated by reference insofar as such disclosures would be applicable to the present invention.

THE FIGURES

DETAILED DESCRIPTION OF THE INVENTION

Figure 1:
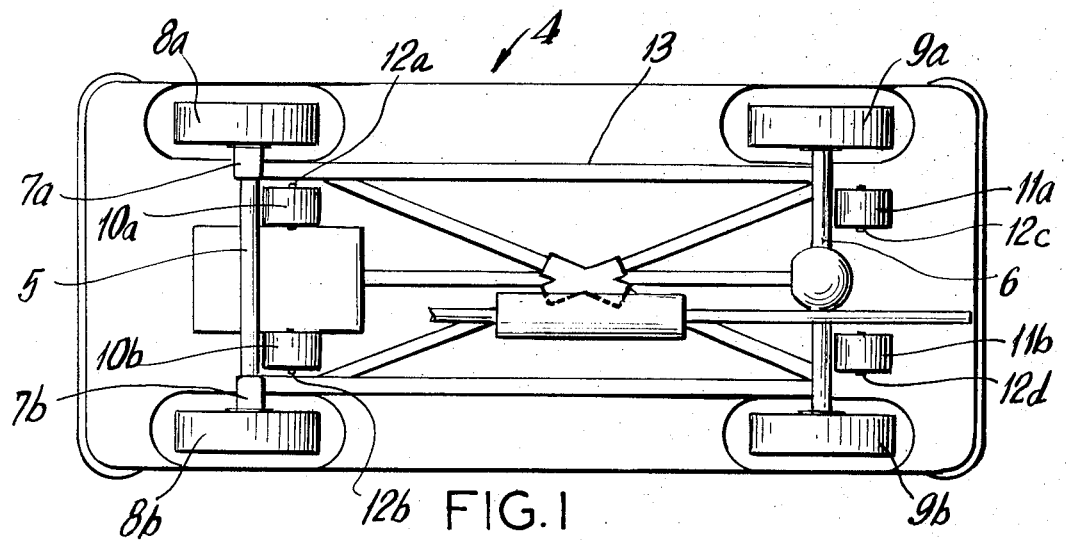
FIG. 1 illustrates a bottom plan view of a typical automobile embodying the invention of the present application, each of four separate wheel positions having its respective ejectable accessory wheel.

With reference to the above Figures, FIG. 1 illustrates a bottom plan view of an automobile 4 having front axle 5 and rear axle 6, with front axle steering mechanisms 7a and 7b for the respective front wheels 8a and 8b. Wheels 9a and 9b are mounted on the rear driving axle 6. Besides each of the respective wheels 8a, 8b, 9a, and 9b are accessory wheels respectively 10a and 10b, and 11a and 11b. The wheels are mounted respectively on their separate axes 12a, 12b, 12c, and 12d. For perspective and also for future reference, FIG. 1 also illustrates the frame 13 of the automobile.

Figure 2:
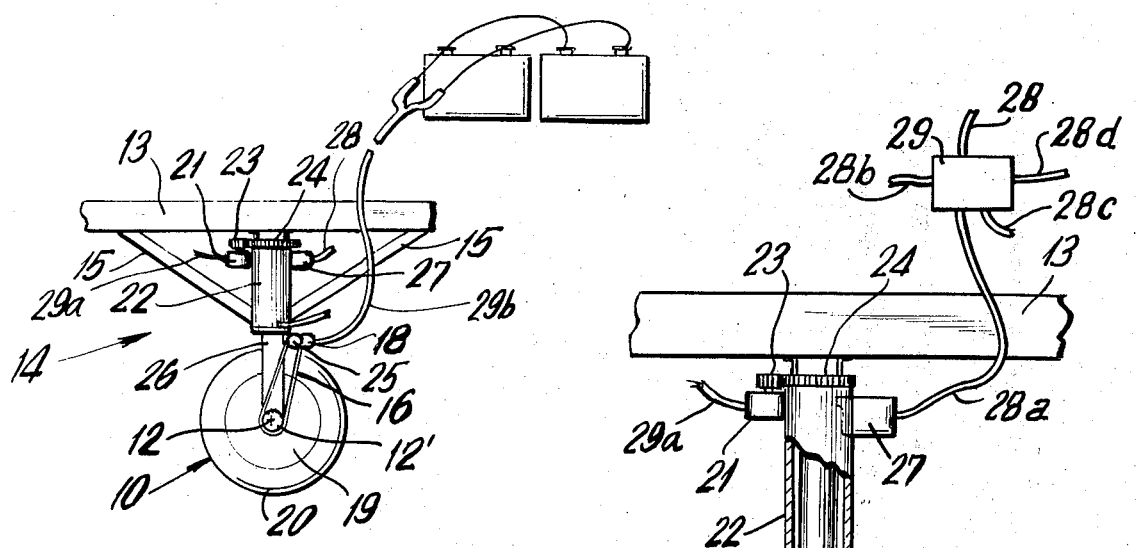
FIG. 2 illustrates diagrammatically a side view shown in-part of an ejectable accessory wheel of the present invention and of a plurality of batteries in parallel connected thereto.
Figure 3:
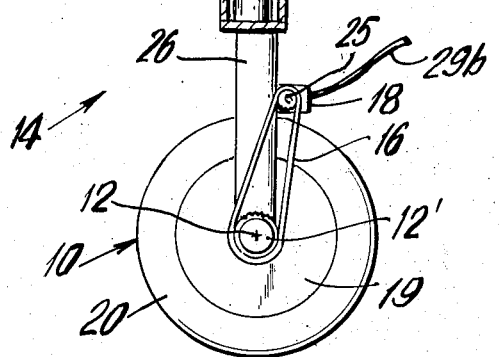
FIG. 3 illustrates in enlarged side view with partial cut-away diagrammatically a typical structure for an ejectable accessory wheel in the ejected state.

FIG. 2 illustrates diagrammatically a typical retracted ejectable accessory wheel device 14 mounted on frame 13 by supports 15. Typically an accessory wheel 10 is mounted on an axis 12 rotatable by a chain or belt 16 as driven by a drive gear 17. The wheel 10 typically includes a rim 19 and a tire 20, preferably of a solid-state type but optionally of a balloon preferably tubeless type. It is to be understood that instead of a tire it may be merely a solid or other type of wearing surface around a rim or other core. The wheel is steered typically by virtue of an additional electric motor 21 which is better viewable in the FIG. 3 illustration, the entire cylinder 22 being turnable by virtue of motor 21 mounted thereon acting by virtue of gear 23 acting against stationary toothed member 24 mounted on the frame 13. The electrical motor 18 with its driving wheel 25 is mounted directly on the ejectable wheel-mounting arm 26 for rotation of the axle 12 which thereby rotates the wheel 10. The ejection and retraction of the arm 26 from the hydraulic cylinder 22 is brought about typically by the fluid control valve 27. It is to be understood that conventional fluid-drive means for providing fluid directly may be employed as well as any other desired fluid-pressure providing mechanism, and typically the fluid is fed to the cylinder by tube means 28 and 28 and 28 a–d, by way of a conventional selector valve switch 29. Electrical terminals of motors 21 and 18 are respectively connected to battery power means by their respective electrical connectors 29a and 29b; the motor 21 and 18 each respectively may be totally an electric motor drive mechanism or may be a conventional combination of electric and hydraulic mechanism in which the hydraulic means is drivable by the electric motor portion thereof.

The illustrated diagrammatic ejection mechanisms are merely representative of one of many possible ways by which the ejection of the accessory wheel may be achieved and by which the steering thereof may be achieved, it being within the scope of the invention to utilize any conventional or other practical and/or desired mechanism.

Accordingly, such modifications and variations and substitution of equivalents are within the scope of the invention to the extent that it would be obvious to a person of ordinary skill in this field.

I claim:

1. A motor vehicle accessory wheel and drive device comprising an automotive carriage and motor vehicle means having at least three wheels operatively mounted on separate front axle and rear axle means; an additional front third wheel and axle means including extension and retraction means for lowering to a position sufficiently extended that the motor and vehicle carriage are supportable at a height such that any wheel mounted on the front axle means is supportable above and free from contact with a normal roadway supporting surface, the forward third wheel axle means including operatively connected steering elements such that any supporting wheel thereof is steerable in both lateral and forward directions; a rearward fourth wheel and axle means including extension and retraction means for lowering to a position sufficiently extended that the motor and vehicle carriage are supportable at a height such that any wheel mounted on the front axle means is supportable above and free from contact with a normal roadway supporting surface, the rearward fourth wheel and axle means including operatively connected steering elements such that any supporting wheel thereof is steerable in both lateral and forward directions; and drive means connected to at least one of said third wheel and axle means and said fourth wheel and axle means, for propelling said at least one wheel and axle means rotatably whereby when supported on said at least one wheel and axle means said motor and carriage vehicle are propellable along a roadway surface thereby; said third and fourth wheel and axle means each including (a) a hydraulic cylinder rotatably-mounted on said carriage, and (b) an electric motor means operatively-mounted to rotatably drive the hydraulic cylinder, whereby an accessory wheel of the hydraulic cylinder is controlably steerable.

2. The device of claim 1, in which the means for extending said third and fourth wheel and axle means to extended states comprises hydraulic motor means.

3. A device of claim 1, in which the means for extending said third and fourth wheel and axle means to an extended state comprises a hydraulic motor means, and additionally including a supplemental battery means operatively connected to drive said hydraulic motor means.

4. A device of claim 1, including switch means for alternatively jointly or separately operating said third and said fourth wheel and axle means.

5. A device of claim 4, in which each of said third and fourth wheel and axle means includes a separate extendable accessory wheel adjacent to each forward and each rearward wheel of a conventional type of the carriage and motor vehicle means, and including means for extending separately each separate extendable wheel.

6. A device of claim 1, in which each accessory wheel has a rollaby-contacting surface contactable with a normal roadway supporting surface when the accessory wheel is in an extended state, said rollably-contacting surface being of a predetermined breadth greater than breadth of respective conventional wheels of the automotive carriage and motor vehicle means.

* * * * *